United States Patent [19]

Poloni

[11] Patent Number: 5,033,689
[45] Date of Patent: Jul. 23, 1991

[54] HIGH SPEED COIL-FORMING HEADSTOCK

[75] Inventor: Alfredo Poloni, Fogliano Di Redipuglia, Italy

[73] Assignee: Danieli & C. Officine Meccaniche S.p.A., Udine, Italy

[21] Appl. No.: 472,810

[22] Filed: Jan. 31, 1990

[30] Foreign Application Priority Data

Feb. 14, 1989 [IT] Italy .................. 83327 A/89

[51] Int. Cl.⁵ ............................................. B21C 47/14
[52] U.S. Cl. .............................................. 242/82
[58] Field of Search ............... 242/82, 83, 47, 47.01

[56] References Cited

U.S. PATENT DOCUMENTS

| | | |
|---|---|---|
| 1,624,000 | 4/1927 | Honig . |
| 2,929,574 | 3/1960 | Henning ................. 242/82 |
| 3,069,108 | 12/1962 | Dean et al. ............. 242/82 |
| 3,780,963 | 12/1973 | Hirschfelder .......... 242/82 |
| 4,765,556 | 8/1988 | Nasrah ................... 242/82 |

FOREIGN PATENT DOCUMENTS 694249 7/1940 Fed. Rep. of Germany .

Primary Examiner—John M. Jillions
Attorney, Agent, or Firm—Antonelli, Terry, Stout & Kraus

[57] ABSTRACT

High speed coil-forming headstock which works at speeds up to and over 150/180 meters a second and comprises a stator (11) and a rotor (12), a planetary ring (16) being included at the position at which a diameter of the stator (11) and rotor is greatest (12) and comprising at least one first bearing (14) between the planetary ring and the stator (11) and at least one second bearing (15) between the planetary ring and the rotor (12), the planetary ring (16) being able to idle and having a limited lengthwise extent and bearing a plurality of pinions (19) arranged in a ring with their axis parallel to the axis of the rotor (12), the pinions (19) meshing with peripheral inner (17) and outer (18) teeth included on the stator (11) and rotor (12) respectively.

4 Claims, 1 Drawing Sheet

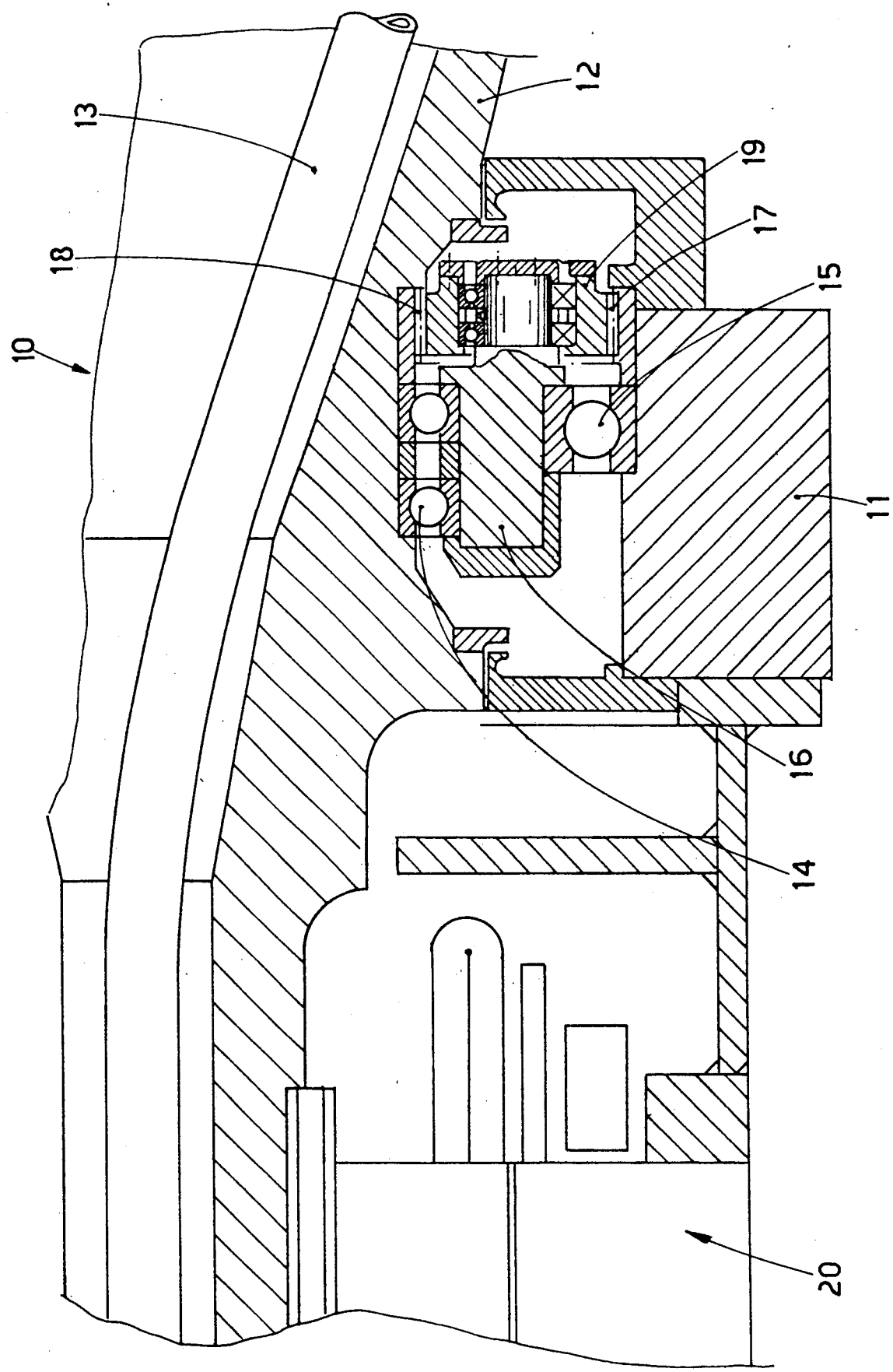

HIGH SPEED COIL-FORMING HEADSTOCK

This invention concerns a coil-forming headstock able to form coils at high speed. To be more exact, the invention concerns a coil-forming headstock capable of being positioned at the end of a rolling line producing wire rod at a high speed, the coil-forming headstock being located upstream of a line to cool coils of wire rod.

The invention concerns a coil-forming headstock able to process up to and more than 150/180 meters of rolled rod per second.

Coil-forming headstocks suitable to process at this speed are not known at the present time.

The known coil-forming headstocks work up to 100/120 meters a second and are prevented from exceeding this speed owing to the inherent limitations of the bearings and to the masses which would otherwise come into play. It is known that bearings of a given size withstand a well determined difference in speed between their inner and outer races, and this difference in speed cannot be exceeded except for very short times without damage to the bearings themselves.

The disclosure of U.S. Pat. No. 4,765,556, which provides for a first hollow shaft and a second hollow shaft, these shafts being coaxial and concentric, is known. Both these hollow shafts get their motion from one single motor which actuates a pair of coaxial gear wheels. This disclosure entails many drawbacks.

This system is very costly as it requires a great number of auxiliary bearings; it is also very noisy as it includes a high-speed transmission with gear wheels; but above all it entails inherent limitations due to the great masses set in rotation, the masses consisting of the gear wheels and hollow shafts.

These masses not only require great power but entail considerable inertia during start-up and stopping; they also require complex articulated structures for support purposes.

Moreover, the result is a complex lay-out which involves heavy maintenance costs and long maintenance times.

Furthermore, the outer hollow shaft can only cover a part of the inner hollow shaft and thus leaves an important part of the inner shaft supported as a cantilever, thereby entailing problems of vibrations, anomalous stresses and misaligned rotary pressures.

The present invention therefore tends to overcome the limitations imposed by the state of the art and therefore enables the working speed of coil-forming headstocks to be doubled in practice, thus making it possible to process rolled rod travelling even at 150/180 meters a second.

The invention also provides the advantages of entailing smaller masses, a simple design easy to assemble and dismantle and lesser bearing structure requirements.

According to a preferred variant the use of a rotor solidly connected directly to the rotor of the motor makes the design and finished product very clean and simple.

A coil-forming headstock normally comprises a stator and a rotor holding the guide for the rolled stock.

According to the invention a planetary ring is positioned between the stator and the rotor at their reciprocal position of greatest diameter and has simple support functions.

According to the invention the planetary ring is set in rotation by a plurality of pinions supported by the planetary ring itself and cooperating directly with the rotor and stator.

The planetary ring is made to rotate at a pre-set speed, so that the bearings located between the planetary ring and the stator and rotor respectively have an acceptable speed differential.

In fact, in this way the difference in speed between the inner and outer races of the bearings is substantially halved.

According to a preferred variant the rotor is keyed directly to the rotor of the electric motor.

The single attached drawing, which is given as a nonrestrictive example, shows a partial section of a coilforming headstock according to the invention.

In the attached figure a coil-forming headstock 10 comprises a motor 20 which, in cooperation with a stator 11 and a rotor 12, brings the rotor 12 to the required speed of rotation. The motor 20 has its rotor solidly fixed to the rotor 12 of the coil-forming headstock 10.

A planetary ring 16 conformed as a toric ring having a very limited length is included between the stator 11 and the rotor 12 at the position of the greatest substantial diameter.

The planetary ring 16 is positioned at and cooperates with the zone of installation of bearings of the greatest diameter, that is to say, it cooperates with the zone downstream of the motor 20 where a guide 13 for the rolled stock enlarges its position.

The planetary ring 16 comprises between itself and the rotor 12 first bearings 14 and between itself and the stator 11 one or more second bearings 15.

Peripherally arranged outer teeth 18 are comprised on the rotor 12 and peripherally arranged inner teeth 17 are comprised on the stator 11.

Pinions 19 are fitted so as to idle rotatably on the planetary ring 16 and mesh with the outer teeth 18 of the rotor and with the inner teeth 17 of the stator. In this way the planetary ring 16 rotates at a desired number of revolutions intermediate between the number, substantially nil, of revolutions of the stator 11 and the number of revolutions required by the rotor 12. Thus there will be different speeds of rotation of the stationary race and rotary race of the second bearings 15, and the difference will be much less than if the rotary race were connected directly to the rotor 12.

The same applies to the first bearings 14, in which the difference in rotation speed between inner and outer races is very different from what it would be if the outer races were connected to the stator 11.

In this way the difference between the speed of the inner race and that of the outer race in the bearings is therefore very small and is normally acceptable for the bearings and capable of being withstood for a very long time without any yielding or deformations.

According to the invention the planetary ring 16 has small dimensions and therefore the overall bulk of the coilforming headstock is not affected thereby.

The first and second bearings 14–15 are included in a small number, advantageously but not only three (two first bearings 14 plus one second bearing 15), and have small dimensions.

I claim:

1. High speed coil-forming headstock which works at speeds up to and over 150/180 meters a second and comprises a stator and a rotor, a planetary ring being included at about a position at which a diameter of the stator and rotor is the greatest and comprising at least one first bearing between the planetary ring and the stator and at least one second bearing between the planetary ring and the rotor, the coilforming headstock being characterized in that the planetary ring is able to idle and has a limited lengthwise extent and bears a plurality of pinions arranged in a ring with their axis parallel to the axis of the rotor, the pinions meshing with peripheral inner and outer teeth included on the stator and rotor respectively.

2. Coil-forming headstock as claimed in claim 1, in which the rotor of an electric motor is solidly fixed to the rotor of the coil-forming headstock.

3. Coil-forming headstock as claimed in claim 1 in which the bearings between the planetary ring and the stator are one in number.

4. Coil-forming headstock as claimed in claim 1, in which the bearings between the planetary ring and the rotor are two in number.

* * * * *